Oct. 27, 1953
J. B. KUCERA
2,657,093
PLANT SPRAYING MACHINE
Filed April 27, 1950
8 Sheets-Sheet 4
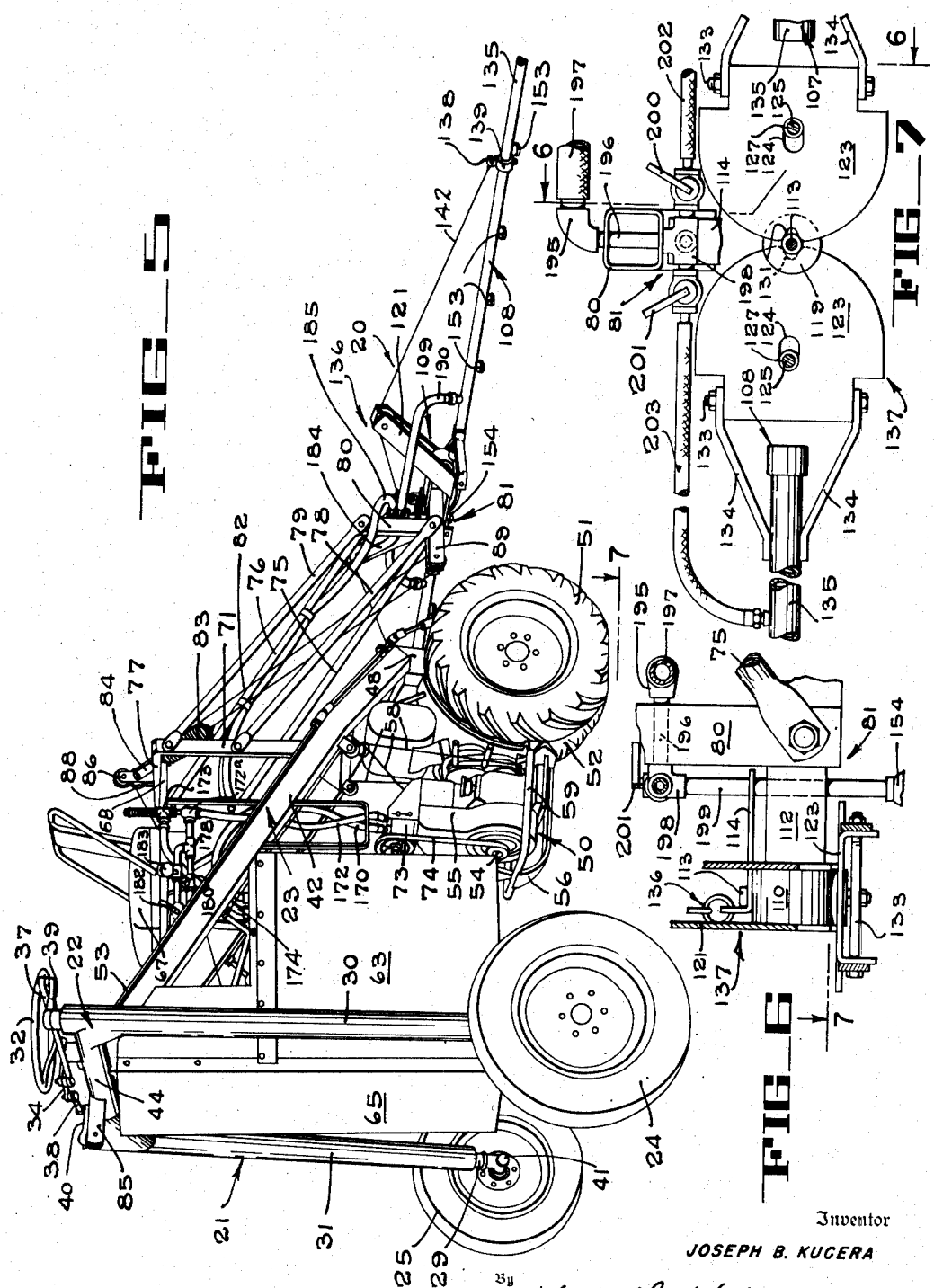
Inventor
JOSEPH B. KUCERA
By Hans G. Hoffmeister
Attorney

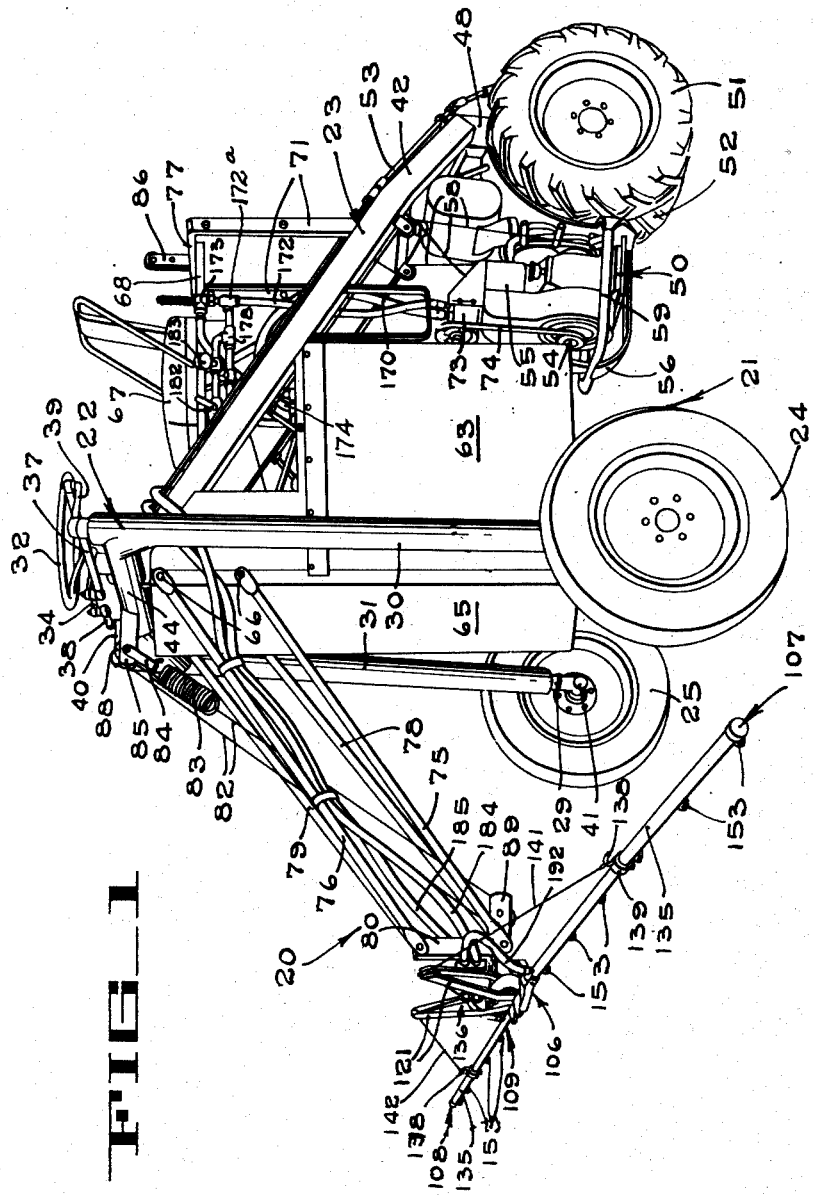

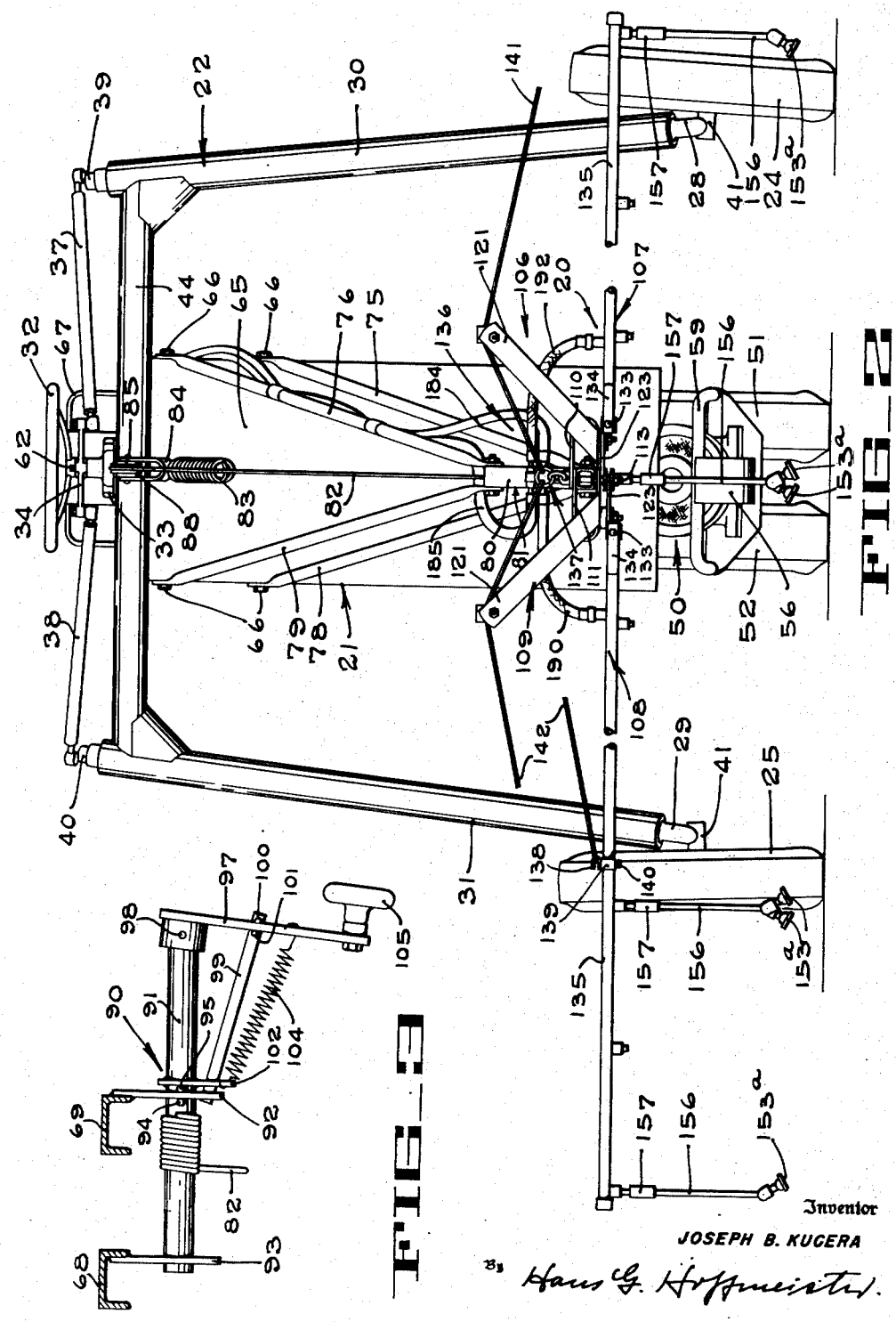

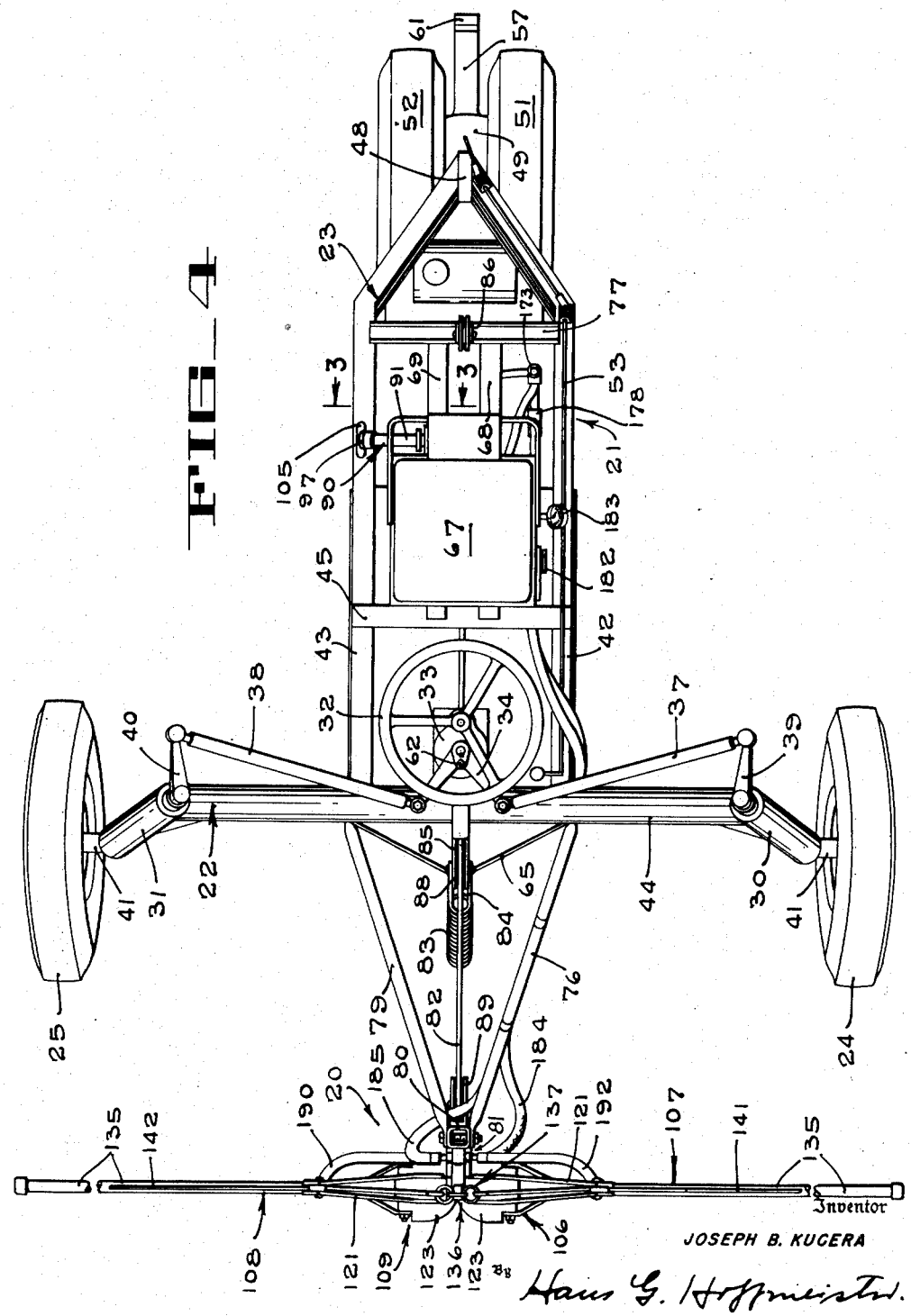

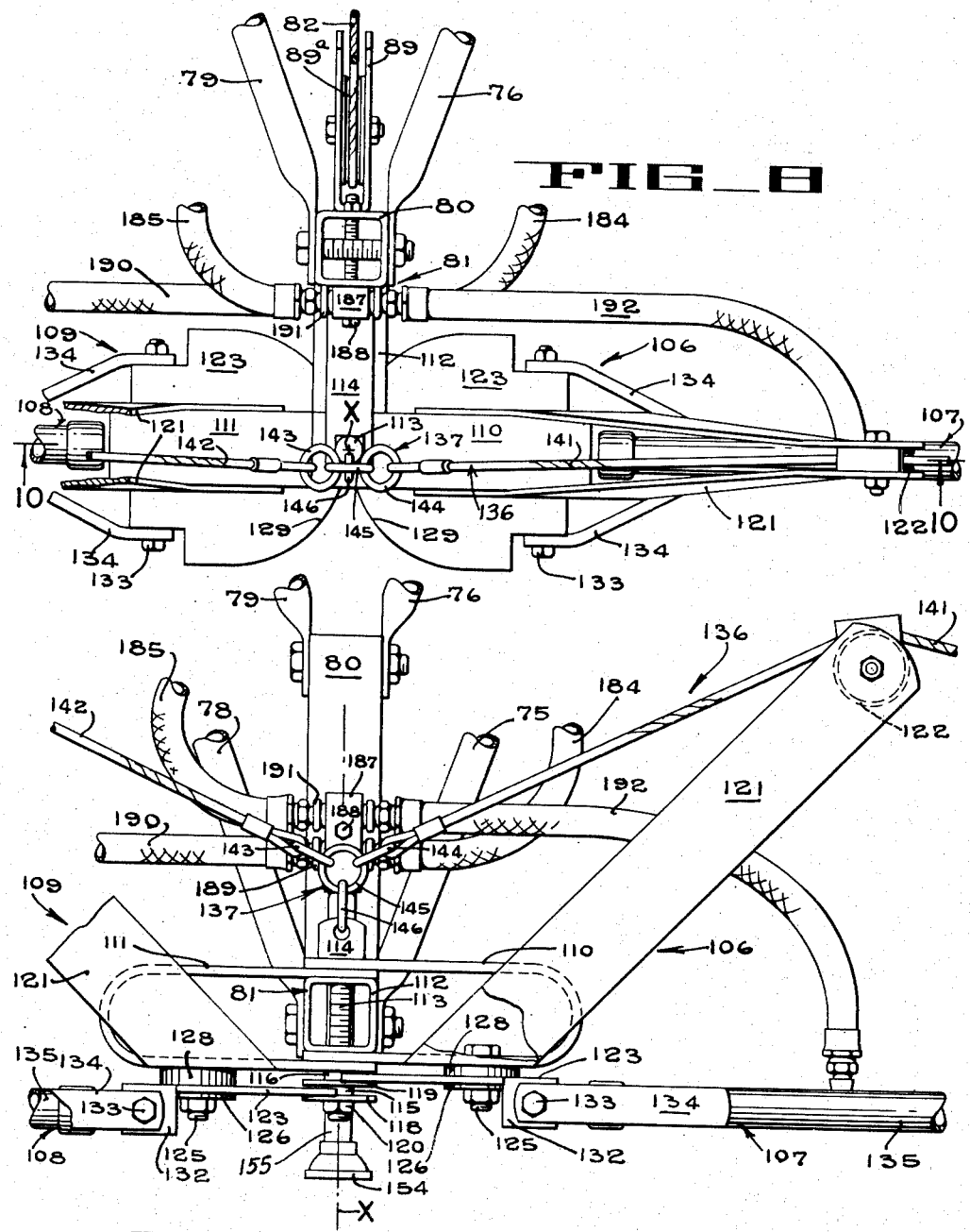

Oct. 27, 1953 J. B. KUCERA 2,657,093
PLANT SPRAYING MACHINE
Filed April 27, 1950 8 Sheets-Sheet 6
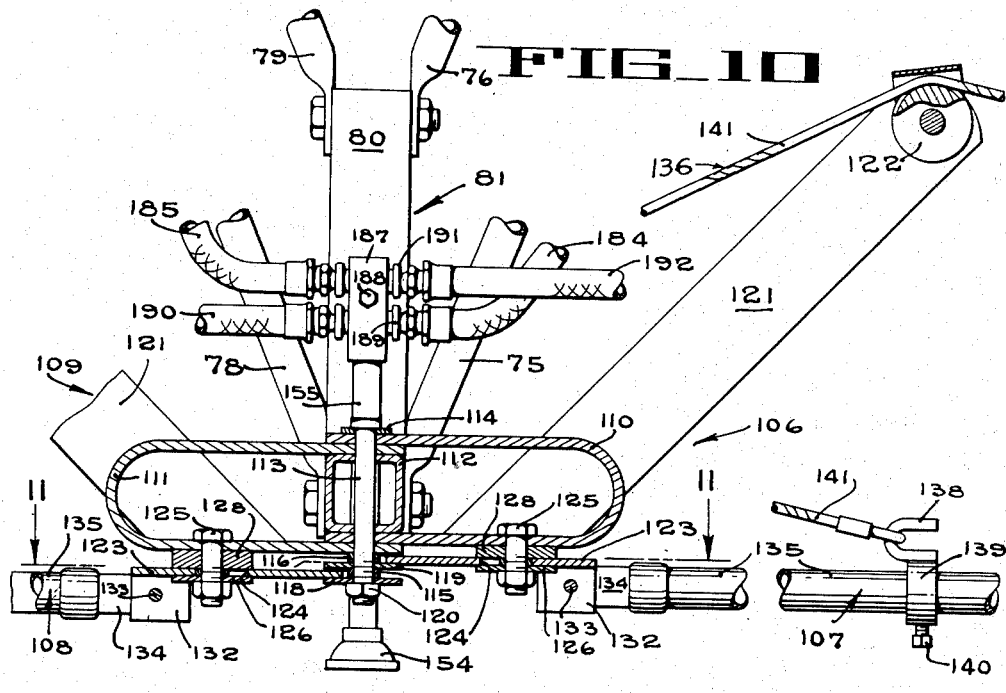
FIG_10
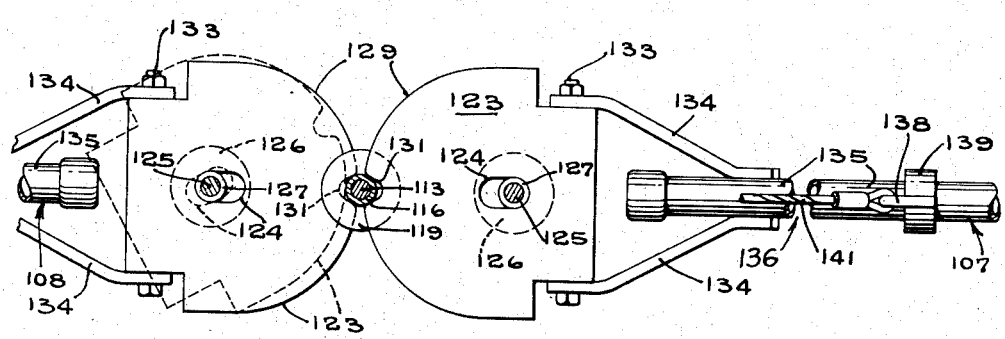
FIG_11
Inventor
JOSEPH B. KUCERA
By Hans G. Hoffmeister
Attorney Oct. 27, 1953  J. B. KUCERA  2,657,093
PLANT SPRAYING MACHINE
Filed April 27, 1950  8 Sheets-Sheet 7
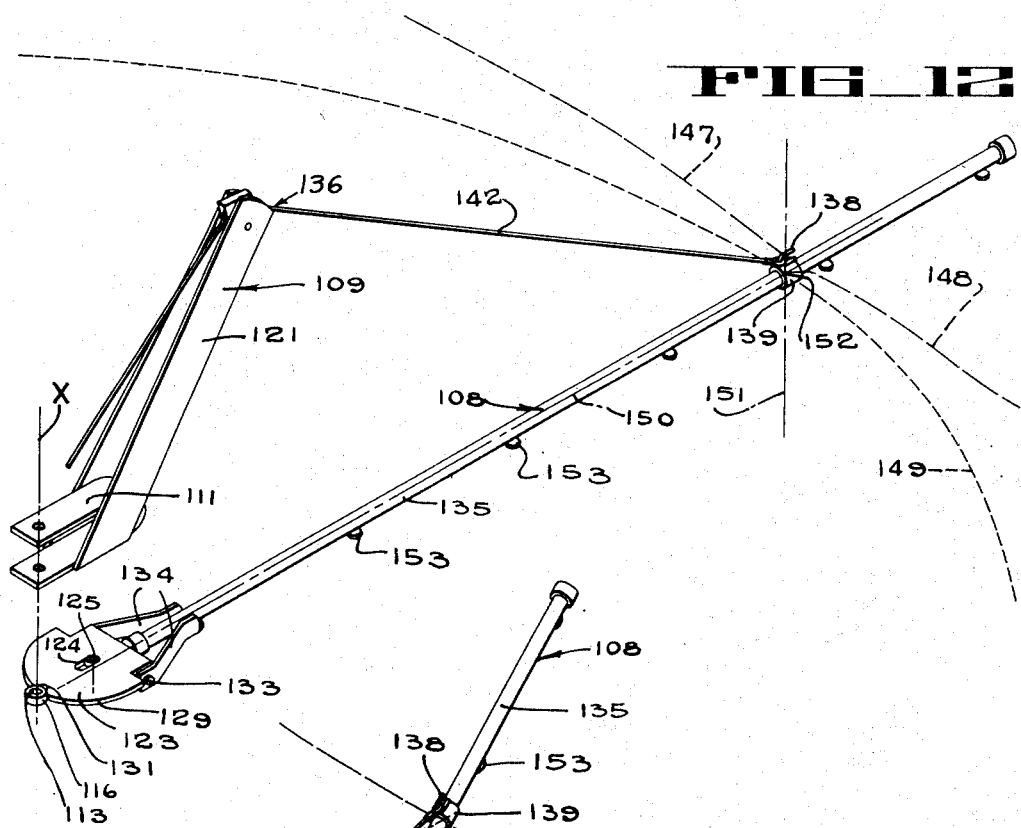
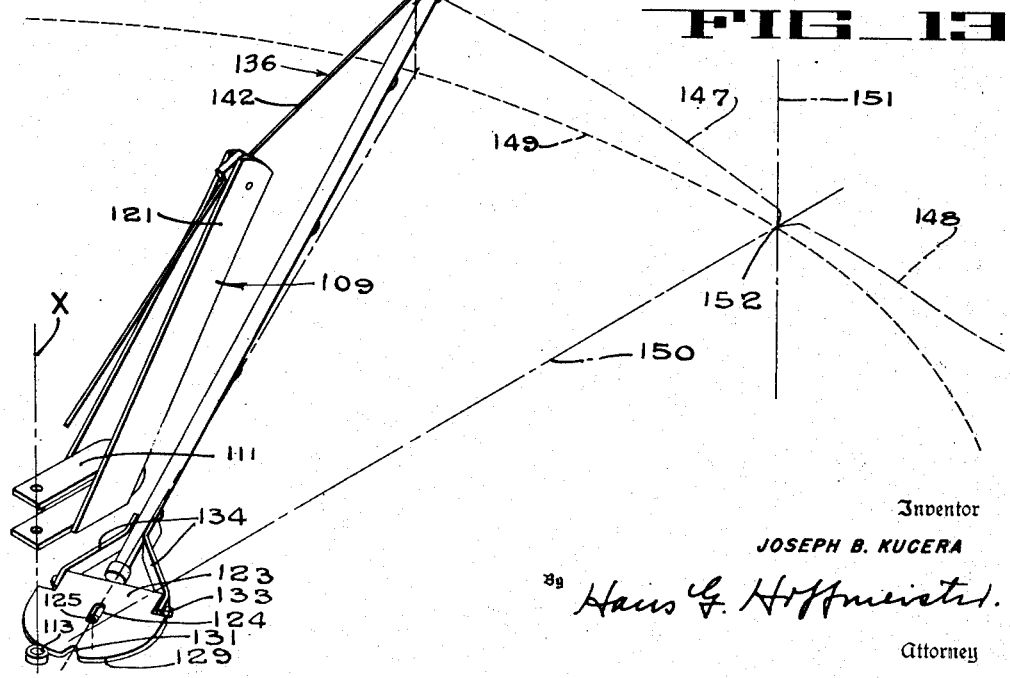
Inventor
JOSEPH B. KUCERA
By Hans G. Hoffmeister.
Attorney Oct. 27, 1953
J. B. KUCERA
2,657,093
PLANT SPRAYING MACHINE
Filed April 27, 1950
8 Sheets-Sheet 8
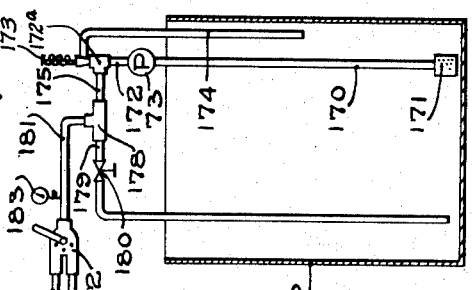
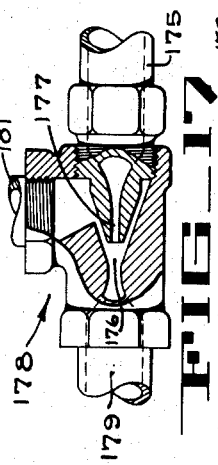
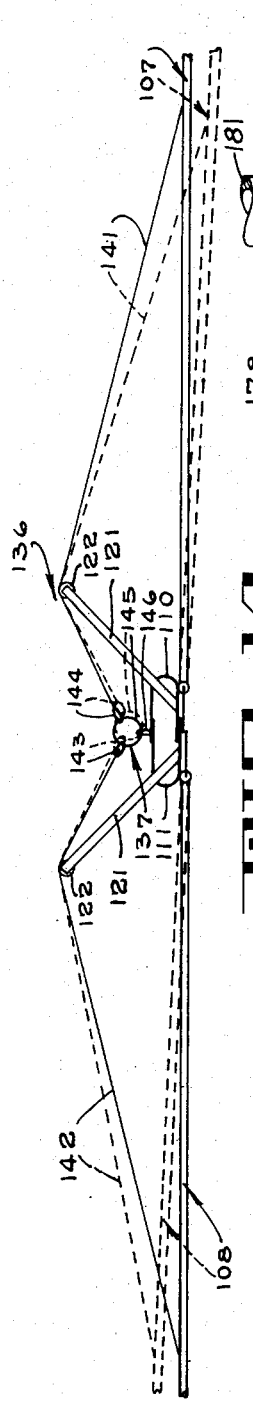
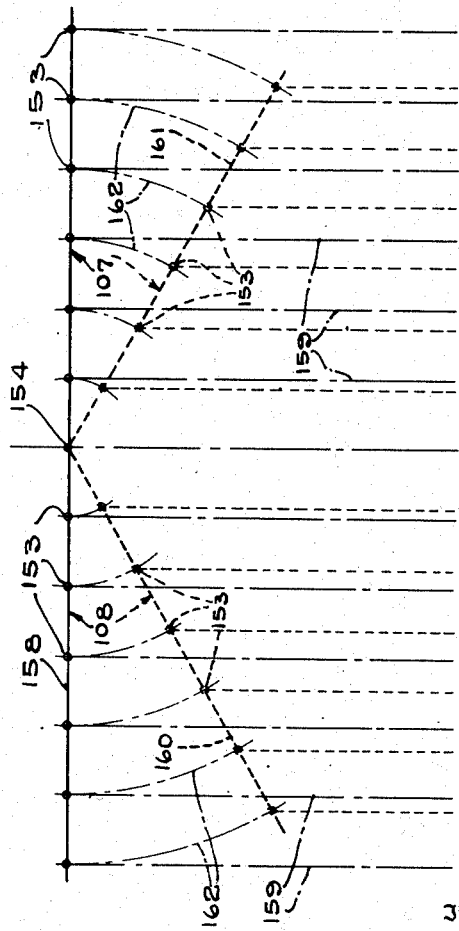
Inventor
JOSEPH B. KUCERA
By Hans G. Hoffmeister
Attorney Patented Oct. 27, 1953

2,657,093

UNITED STATES PATENT OFFICE 2,657,093

PLANT SPRAYING MACHINE

Joseph B. Kucera, Traer, Iowa, assignor to Food Machinery and Chemical Corporation, San Jose, Calif., a corporation of Delaware Application April 27, 1950, Serial No. 158,578

16 Claims. (Cl. 299—42)

The present invention relates to spraying mechanisms, and more particularly to a high clearance row crop spraying machine having a wide range of utility and adjustability.

An object of the present invention is to provide spraying mechanism which can be used for the application of liquid spray material to widely varying types of row crops.

Another object is to provide a machine for effectively spraying row crops of different heights, from low growing vegetables to corn approaching maturity.

Another object is to mount the spray boom of a sprayer in a flexibly equalized suspended arrangement whereby the inertia of the boom tends to maintain it level when the tractor body is jostled from its normal position as in striking a rock or chuck hole.

Another object is to provide a row crop spraying machine with a spray boom having a multiplicity of spray nozzles therein, two portions of the boom being made adjustable substantially coaxially relatively to a central spray head support for proportionately adjusting the lateral separation between the spray tracks of the nozzles when the machine travels across a field.

Another object is to provide an improved high clearance sprayer for use in spraying high growing row crops.

Another object is to prevent spraying liquid from dripping from the spray nozzles of a spraying mechanism between spraying operations.

Another object is to provide an improved boom for sprayers which can be displaced from an adjusted position without injury when it strikes against a solid object, and will thereafter automatically swing back to its adjusted position without interruption of the spraying operation.

Another object is to arrange cam centering means normally to retain a swingable spray boom in predetermined centered position.

Another object is to provide a new vehicle frame structure and spray boom support arrangement for an agricultural machine.

These and other objects and advantages of the invention will be apparent from the following description of the accompanying drawings wherein:

Fig. 1 is a perspective view of a machine embodying the present invention.

Fig. 2 is an enlarged front elevation of the machine shown in Fig. 1, portions of a spray boom being broken away.

Fig. 3 is an enlarged fragmentary section taken along line 3—3 of Fig. 4.

Fig. 4 is a plan view of the mechanism shown in Figs. 1 and 2, portions of the spray boom being broken away, Fig. 5 is a perspective view in slightly reduced scale showing the machine of Figs. 1, 2 and 4 with the spray mechanism mounted to extend rearwardly along the sloping rear side of a supporting vehicle instead of forwardly therefrom as shown in preceding figures.

Fig. 6 is a fragmentary, somewhat diagrammatic, sectional view as on the line 6—6 of Fig. 7 showing a single hose arranged to supply liquid to the spray boom.

Fig. 7 is a section on the line 7—7 of Fig. 6.

Fig. 8 is an enlarged fragmentary plan view of a head frame having a pair of boom sections mounted thereon.

Fig. 9 is a front elevation of the structure shown in Fig. 8.

Fig. 10 is a section taken along line 10—10 of Fig. 8, a hook for attaching a boom support cable being shown.

Fig. 11 is a section taken along the line 11—11 of Fig. 10.

Fig. 12 is a diagrammatic view in the nature of a perspective showing a pivoted suspension mounting arrangement for a boom section, the boom section being in normal position.

Fig. 13 is a view similar to Fig. 12 with the boom section displaced laterally from a normal suspended position.

Fig. 14 is a diagrammatic view showing a flexible equalized suspension arrangement for the boom sections.

Fig. 15 is a diagram in the nature of a plan view showing the paths of the spray nozzles in different adjusted positions of the spray boom sections.

Fig. 16 is a diagrammatic view in the nature of a vertical section through a liquid supply tank and control equipment for a double hose liquid supply system for the spray nozzles.

Fig. 17 is a view partly in elevation and partly in section of an ejector T-fitting used in controlling the flow of spraying liquid to the nozzles.

Referring first to Figs. 1, 2 and 4 of the drawings, spraying apparatus 20 comprising a feature of the present invention is illustrated as being mounted on the forward end of a special power driven vehicle 21. The vehicle has a generally rectangular, high arched front frame portion 22, and a relatively narrow, downwardly and rearwardly sloping central frame portion 23. Dirigible front wheels 24 and 25 of usual automobile type are journaled on wheel spindles 41 welded to extend laterally from the lower ends of steering posts 28 and 29.

The steering posts are rotatively mounted within the generally upright tubular legs 30 and 31 of the front frame portion. The legs 30 and 31 are tilted inwardly and rearwardly at their upper ends to provide caster and tilt necessary for proper steering characteristics in accordance with usual automotive practice.

A steering wheel 32 (Figs. 2 and 4) is secured to a stub shaft journaled in a gear box 33 and is connected by usual reduction gearing, not shown, to a bell crank lever 34. Links 37 and 38 connect the arms of the bell crank lever 34 to lever arms 39 and 40, secured to the upper ends of the steering posts 28 and 29, respectively.

In the illustrated vehicle 21 the tread width of the front wheels is not adjustable. However, a tread width of eighty inches has been found suitable for use among crops planted in rows spaced on forty-two, forty, thirty-eight and thirty-six inch centers. These spacings are considered almost a standard range for most row crops in the United States.

The narrow sloping central frame portion 23 comprises a pair of longitudinally disposed channel members 42 and 43, secured at their forward ends to the top cross bar 44 of the front frame 22 and braced in laterally separated position by a transverse frame member 45 (Fig. 4). The lower, rearward end portions of the longitudinal central frame members 42 and 43 converge and are secured to opposite sides of a vertical frame member 48 which extends upwardly from a narrow transmission case 49 of a power drive unit 50.

This drive unit, in the illustrated embodiment of the invention, comprises a well known type of garden tractor drive mechanism. Other types of wheeled rear end supports can, of course, be substituted for that illustrated, although it is desirable to mount the heavier portions of the machine as low as practicable in order to provide a low center of gravity and thereby increase the stability of the machine.

In the form of rear end support and drive mechanism illustrated, a pair of rubber tired drive wheels 51 and 52 are mounted in closely juxtaposed position on opposite sides of the narrow transmission case 49 (Fig. 4). The transmission case has usual change-gear drive mechanism embodied therein and is adapted to be controlled from the driver's seat by an articulated gear shift rod 53 (Figs. 1 and 4), so that the torque impulse from the drive shaft 54 of an internal combustion engine 55 mounted on the forward end of the transmission case 49, can be transmitted at selected reduced speeds to the drive wheels. Usual throttle, clutch and brake mechanisms also are provided, and are connected by cables 58 (Fig. 1) to usual pedals and levers, not shown, mounted within convenient reach of an operator.

An engine guard structure comprising a tubular frame 59 with a shoe 56 welded to extend lengthwise thereof, is mounted (Figs. 1, 2 and 5) beneath the engine to protect it from obstacles over which the machine may be driven. A towing lug 61 is provided on a rearwardly extending portion 57 of the transmission case 49, so that the entire rear end of the vehicle 21 can be raised up and secured by the towing lug to a co-operating hitch member, not shown, mounted on a truck or tractor for towing the machine along a road or highway. When thus towing the vehicle, the front wheels 24 and 25 (Figs. 2 and 4), then in trailing position, are adapted to be locked in straight fore-and-aft position by a set screw 62 which is adapted to be screwed through a hole in the bell crank lever 34 into anchoring engagement with a socket provided therefor in the steering gear box 33.

A liquid supply tank 63 (Figs. 1, 5 and 16), sufficiently narrow to pass between adjacent rows of high growing food plants, such as corn, is mounted centrally of the machine. The rear end of the spray tank is suspended from the rearwardly sloping central frame members 42 and 43 so that the top of the tank forms a floor for the operator's compartment. The forward end of the spray tank 63 is suspended from the top cross bar 44 of the arched front frame portion 22 by a plate 65. The plate 65 is V-shaped in cross section, with the apex of the V directed forwardly to form a prow which deflects the plants laterally as the machine passes between adjacent rows thereof and prevents them from being bent over and damaged. The upper portion of the tank support plate 65 comprises a shield which protects the legs of the operator when seated on a seat 67.

The seat 67 is mounted for slidable fore-and-aft adjustment on tracks 68 and 69 (Figs. 1, 4 and 5), and is adapted to be secured in adjusted position thereon by a usual locking lever, not shown. The seat tracks 68 and 69 are supported at their forward ends on the transverse bracing member 45, and at their rearward ends on a transverse bracing member 77, secured across the upper ends of a pair of uprights 71, mounted on the longitudinal frame members 42 and 43. The upright seat track support members also serve as alternate mounting supports for two pairs of parallel links which adjustably support a pair of spray boom sections in a manner to be described later herein.

A hydraulic pump 73 (Figs. 1, 5 and 16) for pumping the spraying liquid is mounted on the engine support and is adapted to be driven from the engine by a V-belt 74 passing around pulleys secured to the pump shaft and to the engine drive shaft. The spraying apparatus 20 is shown in Figs. 1, 2 and 4 as it appears when mounted on the forward end of the vehicle 21, and in Figure 5 in its rearwardly mounted position thereon. In its forwardly mounted position (Fig. 1), the rearward ends of two sets of parallel links 75 and 76, and 78 and 79 are pivotally mounted by pivot bolts 66 in vertically spaced relation on opposite sides of the upper portion of the tank support and shield member 65. The forward ends of the links are pivotally mounted in similarly vertically spaced relation on opposite sides of an upright, rectangular tubular portion 80 of a head frame 81 (Figs. 1, 2, 4, 5 and 8 to 10).

For controlling the vertical swinging movements of the parallel links 75, 76, 78 and 79, and thereby controlling the elevated position of the head frame 81, an elevating control cable 82 has one end thereof attached to an end of a relatively strong suspension coil spring 83, the other end of the spring being connected by a yoke 84 (Figs. 1, 2 and 4) to a pulley support bracket 85 welded to extend forwardly from the top bar 44 of the arched transverse front frame portion 22. A generally similar alternate pulley and spring support bracket 86 is welded to the transverse rear seat track support member 77 (Figs. 1, 4 and 5) to be used when mounting the spraying apparatus on the rear of the vehicle as shown in Fig. 5.

The elevating control cable 82 passes around a pulley 89a (Fig. 8) journaled between the side portions of a U-shaped bracket 89 (Figs. 1, 4 and 8) welded to the rear face of the rectangular tubular head frame member 80, and thence upwardly and over the pulley 88 (Figs. 1, 2 and 4) journaled in the forwardly extending bracket member 85. From here the cable passes downwardly and around pulleys, not shown, which conduct it through the operator's compartment to a winch 90 (Figs. 3 and 4) mounted beneath the seat 67.

The winch 90 (Fig. 3) comprises a shaft 91 journaled in holes in plates 92 and 93 welded to extend downwardly from the seat support tracks 68 and 69, respectively. Pins 94 and 95, inserted through holes in the winch shaft 91, are disposed on opposite sides of the mounting plate 92 to prevent axial displacement of the winch shaft. An automatically locking crank handle 97 is pivotally connected to the winch shaft 91 by a pin 98 to swing about an axis normal to that of the winch shaft. The locking mechanism for the crank handle comprises a locking pin 99, inserted with a loose fit in a hole in the crank handle 97, and secured against axial displacement therein by pins 100 and 101. The locking pin 99 also is inserted slidably through a hole in a guide plate 102 welded to the winch shaft 91 outwardly of the fixed support plate 92 in which the winch shaft is journaled. A series of symmetrically arranged holes are provided around the opening for the winch shaft 91 in the support plate 92, and are adapted to selectively receive the inner end of the locking pin 99 therein.

A coil spring 104 is connected in tension between the crank handle 97 and the plate 102, normally to draw the crank handle inwardly to urge the locking pin 99 into one of the locking holes in the winch mounting plate 92. The portion of the winch shaft 91 which lies between the mounting plates 92 and 93 forms the drum of the winch, and the end of the spray head elevating cable 82 is inserted through a hole in this drum portion of the shaft and is secured therein.

To operate the winch the driver grasps the knob 105 on the crank handle, and pulls it outwardly, or to the right as illustrated in Fig. 3, to withdraw the locking pin 99 from its hole in the mounting plate 92, after which the cable can be wound or unwound from the drum portion of the crank shaft by turning the crank handle 97. Releasing the crank handle allows the spring 104 to draw the crank 97 inwardly and thereby move the locking pin 99 into one of the locking holes in the plate 92 to secure the winch in adjusted position.

A pair of boom suspension brackets 106 and 109 (Figs. 1, 2, 4 and 8 to 10) are pivotally mounted to swing about an upright axis x (Figs. 8, 9, 12 and 13) on the head frame 81. A pair of U-shaped members 110 and 111 (Figs. 2, 8, 9 and 10) forming the respective lower portions of the boom suspension brackets 106 and 109, are mounted horizontally in opposed, endwise overlapping relation (Figs. 8, 9 and 10) to receive therebetween the forward portion of a forwardly extending rectangular tubular or block portion 112 of the head frame 81. A pivot bolt 113, having a ring anchoring bracket 114 gripped beneath its head, is inserted downwardly through holes in the overlapping end portions of the U-shaped members 110 and 111 and through vertically aligned holes in the horizontal rectangular tubular portion 112.

A pair of follower sleeves 115 and 116 (Fig. 10), are mounted on the shank of the bolt 113 below the overlapped inner ends of the U-shaped members 110 and 111. If desired these followers may be rollers of a usual type. A pair of retaining washers 118 and 119 are fitted over the shank of the bolt 113 and are interposed, one between the followers 115 and 116, and one between the lower follower 115 and the nut 120 of the bolt 113. The nut 120 is screwed onto the bolt and is drawn down tight, frictionally to hold the boom suspension brackets 106 and 109 in angularly adjusted position.

Each boom support bracket 106 and 109 has a pair of diagonally upwardly and outwardly extending arms 121 welded to opposite sides of the U-shaped members 110 and 111. A pulley 122 is mounted to rotate in a vertical plane between the upper outer ends of each pair of arms 121.

A pair of similar boom sections 107 and 108 (Figs. 1, 2, 4 and 8 to 11) are pivotally mounted one on each of the boom suspension brackets 106 and 109. Each boom section (Figs. 10 and 11) comprises a support plate 123 having a slotted opening 124 therein to receive a pivot bolt 125 mounted in the lower arm of each of the U-shaped members 110 and 111. A bearing sleeve 127 is mounted on each of the pivot bolts 125, the slotted opening 124 being of a size to receive the bearing sleeve 127 for pivotal and slidable movement therein. The bearing sleeve 127 is slightly longer than the thickness of the plate 123 to prevent binding of the plate between a pair of retaining washers 126 and 128 when the nut on the bolt 125 is drawn down tight.

Each plate 123 has a substantially circularly curved or arcuate edge portion 129, the center of curvature thereof being within the slotted opening 124.

A boom centering notch 131 is provided in the curved edge 129 of each of the plates 123 in alignment with a prolongation of the center line of the slotted opening 124. The centering notches 131 are of a size to receive the followers 115 and 116 therein to restrain the boom sections 107 and 108 against swaying (Fig. 12), but the sides of the notches are disposed at angles which will permit the followers to cam out of the notches (Fig. 13) and allow the boom section to swing on its pivot bolt 125 in the event a boom section should strike some obstruction such as a fence post which otherwise might damage the boom. The cam action of the follower in leaving its notch forces the boom endwise outwardly, the slotted opening 124 being of sufficient length to permit slidable outward displacement of its associated boom section without binding.

A pair of downturned ears 132 (Figs. 9 and 10) are provided on the sides of each pivotal support plate 123, and a pivot bolt 133 is inserted horizontally through holes in these ears, and also through holes in the inner ends of a pair of straps 134 which are secured, in the form of a yoke, on the inner end of a spray pipe 135 forming part of each boom section. A hook 138 (Figs. 1, 2, 5 and 10 to 13) is mounted on a collar 139 which is secured in axially adjusted position on each spray pipe 135 by a set screw 140 (Figs. 2 and 10).

Equalizing means 136 (Figs. 1, 2, 5, 8 and 9) for flexibly maintaining the two similar boom sections 107 and 108 in balanced equilibrium on the supporting vehicle comprises a pair of boom suspension cables 141 and 142 attached at their inner ends to a flexible anchoring means 137.

The anchoring means 137 comprises a pair of rings 143 and 144, respectively, linked into a ring 145, which in turn is linked into a ring 146 mounted in a hole in the bracket 114 gripped beneath the head of the pivot bolt 113. The boom section suspension cables 141 and 142 pass over the pulleys 122 on the boom suspension brackets 106 and 109 at a point radially beyond the boom section pivot bolts 125, and the outer ends of the cables are attached to the suspension hooks 138 secured in adjusted position on the spray pipes 135.

The two similar boom sections 107 and 108 normally hang in balanced suspension as shown in Figs. 1 and 5, and in solid lines in Fig. 14. However, when the vehicle 21 or either of the boom sections 107 and 108 is subjected to a force tending to tilt the vehicle and the boom section relatively to each other about a longitudinal axis, such relative tilting is permitted by the equalizing means 136, thereby relieving the boom mounting structure of the severe torque stresses to which it would be subjected if the boom were mounted rigidly on the vehicle. Adjustment of the boom sections to compensate for a tilted position of the vehicle when operating on a side hill is made by adjusting the hook supporting collars 139 axially of the spray pipes 135.

The weight of each boom section on its suspension cable 141 or 142 tends to swing the portion of the cable between the pulley 122 and the attaching hook 138 downwardly to a vertically depending position. This load stress is transmitted partly in tension to the cable, and partly in axial thrust to the pipe 135. The inward axial thrust thus imposed on the pipe 135 tends to urge the curved edge 129, or the notch 131 in said curved edge, against its associated follower, 115 or 116, on the bolt 113.

Dotted lines 147 and 148 in Figs. 12 and 13 indicate diagrammatically the paths of movement of a point on the axis of the spray pipe 135 at the collar 139 during swinging movements of a pivoted boom section 108 in both directions from its normal, centered, suspended position shown in Fig. 12. A reference line 149 shows the horizontal circular path which would be described by a radius swung from the axis $x$ of the pivot bolt 113 through the low point on the curve 147—148.

During pivotal displacement of the boom section to the position shown in Fig. 13 from its normal suspended position shown in Fig. 12, the boom support bracket 106 or 109, as the case may be, does not move, but the boom section 108 swings laterally away from the vertical plane of rotation of the pulley 122. This vertical plane is described in Figs. 12 and 13 by reference axes 150 and 151. Therefore, when the boom section is swung for example to the position illustrated in Fig. 13, the suspension cable 142 will extend from the pulley 122 angularly to one side of the vertical plane 150—151, and the outer end of the spray pipe 135 will have been swung upwardly away from the plane defined by the reference curve 149. From this elevated unstable position of the spray pipe 135 gravity will tend to swing it back along the broken line 147 in Fig. 13 toward the lowermost point 152 in its cycle where it will be suspended in the vertical plane of rotation of the pulley 122 as defined by the reference axes 150 and 151. As the boom section approaches its lowermost suspended position indicated by the low point 152 in the curve 147—148, the follower 115 or 116 as the case may be re-enters its associated notch 131 and thereby tends to hold the boom section in its normal, centered, suspended position.

Each spray pipe 135 has a plurality of usual spray nozzles 153 mounted thereon, and a central spray nozzle 154 is mounted on the lower end of a pipe 155 (Fig. 9) centrally of the head frame 81. Where required for certain types of spraying, as for the second brood of corn borers, usual drop tubes 156 (Fig. 2) are mounted in the nozzle openings in the spray pipes 135, and nozzles 153a are then mounted on the lower ends of the drop tubes in a well known manner. The drop tubes preferably are made with intermediate rubber hose sections 157 to provide flexibility and thereby avoid damage to the tubes when they strike an obstruction. The spray nozzles are mounted on centers determined by the maximum separation of rows of crop plants to be sprayed. The innermost spray head 153 in each pipe is spaced from the central spray nozzle 154 by a distance corresponding to the separation between adjacent nozzles 153 in the spray pipes. If desired the central nozzle may be omitted and in such case the innermost nozzle of each spray pipe is spaced from the center of pivotal movement of the boom sections by a distance equal to one-half of the spacing distance for the other spray nozzles from each other.

When the boom sections 107 and 108 are in opposite, aligned position as shown in Figs. 1, 4, 8, 11 and 15, the nozzles will be separated from each other by predetermined distances with respect to a line 158 (Fig. 15) transversely through the machine. The straight dot-dash lines 159 in this same figure represent the paths traversed by the spray nozzles in the aligned boom sections as the machine travels across a field. Upon loosening the nut 120 on the pivot bolt 113, the boom suspension brackets 106 and 109 may be swung either forwardly or rearwardly to move the spray boom sections suspended therefrom to desired angularly adjusted positions, for example to the positions indicated by the dotted lines 160 and 161 in Fig. 15, after which the nut 120 is again drawn down tight to secure the brackets 106 and 109 in their newly adjusted positions. When the boom sections are adjusted from the solid line positions to the dotted line positions in the diagram of Fig. 15 the spray nozzles 153 will be swung inwardly along the curved dot-dash lines 162.

The center nozzle 154, if provided, will not change its position relatively to the longitudinal center line of the machine during angular adjustment of the boom sections, but all of the other nozzles will be moved inwardly by such adjustment to bring their spray paths closer to each other and to the longitudinal center line of the machine as required. For example, by spacing the nozzles on forty inch centers, the machine will be adapted to spray crops planted in rows spaced forty inches apart when the boom sections 107 and 108 are adjusted in their transverse, aligned positions as indicated by the solid line 158 in Fig. 15. By changing the angular positions of the boom suspension brackets 106 and 109 either forwardly or rearwardly from this solid line position as required, the lateral spacing between the nozzles can be reduced to distances proper for the spraying of crops planted in rows spaced apart by other distances as required throughout the full limits of swing of which the boom support brackets 106 and 107 are capable.

Liquid under pressure is supplied to the spray nozzles 153 and, where required, to a central spray nozzle 154 (Figs. 1, 2, 5 and 9) from the liquid supply tank 63 by means of the liquid pump 73 (Figs. 1, 5 and 16). A liquid intake pipe 170 (Fig. 16) extends from the bottom of the spray tank 63 to the intake side of the pump 73 and is provided with a usual suction strainer 171 over its lower end. A pipe 172 is connected from the pump 73 to a usual type of by-pass pressure relief valve 173, from which a pipe 174 returns by-passed liquid to the tank.

Interposed in the pipe 172 is a T-fitting 172a, the side outlet of which is connected by a pipe 175 (Figs. 1, 5 and 16) into one end of a well known form of Venturi ejector T-fitting 178 (Figs. 16 and 17). From the other end of the fitting 178 a pipe 179 is connected through a manual shut-off valve 180, back into the tank 63. The side or aspirating outlet of the ejector T-fitting 178, is connected by a pipe 181, having a usual pressure gauge 183 mounted therein, to the inlet opening of a three-way valve 182.

From the two outlets of the three-way valve 182 a pair of flexible hoses 184 and 185 (Figs. 1, 2, 4, 5, 8, 9 and 16) are carried forwardly along one of the parallel links 76 which support the head frame 81. One of the hoses 184 is connected to one end of a T-fitting 189 (Figs. 9 and 10) secured by a clip 187 and bolt 188 to the forward side of the upright rectangular tubular head frame member 80. From the other end of the T-fitting 189 a flexible hose 190 is connected to the right hand spray pipe 135 (Figs. 1, 2 and 5). The pipe 155 to the center spray nozzle 154 is adapted to be screwed into the side outlet of the T-fitting 189. The other hose 185 from the three-way valve 182 is connected, through a coupling 191 (Figs. 8, 9 and 10), also secured to the forward side of the rectangular tubular member 80 by the clip 187, and through a hose 192, to the left hand spray pipe 135 (Figs. 1, 2 and 9).

The ejector fitting 178 (Fig. 17), has a usual Venturi throat 176 with a jet nozzle 177 positioned to direct a jet of pressurized liquid from the pump axially into the Venturi throat. When the manual shut-off valve 180 is opened, liquid is permitted to flow under pressure through the jet nozzle 177, the Venturi throat 176 and the pipe 179 back into the tank, thereby causing a reduction in pressure in the pipe 181 to below atmospheric. This reduction in pressure in the pipe 181 will be transmitted through either or both of the hoses 184 and 185 to which the three-way valve may be open, and thence to the spray nozzles connected thereto, creating a suction thereon. When the valve 180 is closed however, the liquid from the pump will be forced to flow under pressure through the line 181 to the three-way valve 182, and thence to the hoses and nozzles to which it may be opened. With this arrangement, when reaching the end of a row during a spraying operation, the operator, instead of closing the three-way valve 182 to shut off the flow of liquid to the nozzles, may open the valve 180, which, through the action of the ejector T-fitting 178 creates a suction on the nozzles of the hose or hoses used during the spraying operation. This insures that no spraying liquid will dribble from the nozzles between spraying operations, and is especially important in the spraying of weed control liquids, since, if allowed to drip from the nozzles when turning the machine around at the ends of the field, the liquid is apt to kill valuable crop plants.

A modified arrangement is shown in Figs. 6 and 7. In this arrangement a single hose 197 is substituted for the two hoses 184 and 185. One end of the single hose 197 may be connected to an ordinary shut-off valve, not shown, mounted in place of the three-way valve 182 in the system shown in Fig. 16. The other end of the single hose 197 is connected to an elbow 195, mounted on the head frame 81. A pipe 196 extends from the elbow 195 through aligned holes in the upright tubular member 80 and is inserted in one of the two side outlets of a side outlet T-fitting 198 mounted on the head frame 81. A pipe 199 extends downwardly from the other side outlet of the fitting 198, and the central spray nozzle 154, if employed, is mounted on the lower end of the pipe 199. Otherwise this side outlet may be plugged.

Two manual control valves 200 and 201 are connected, one to each end of the side outlet T-fitting 198, and from these valves, hoses 202 and 203 are connected to the spray pipes 135 of the boom sections 107 and 108, respectively. Thus the flow of spraying liquid to either or both of the spray pipes 135 can be controlled selectively by means of the valves 200 and 201, but the center nozzle 154, where employed, remains open to the hose line 197 at all times.

*Operation*

For the purpose of briefly explaining the operation of the present invention, it will be assumed, first, that the spraying apparatus 20 is mounted on the forward end of the vehicle 21 as shown in Figs. 1, 2 and 4 and that the two-hose, aspirating, liquid supply system shown in Figs. 1, 2, 4, 5 and 16 is employed.

The head frame 81 is adjusted to a proper height relatively to that of the plants to be sprayed by means of the winch 90 and its associated cable 82. The nut 120 (Fig. 10) is then loosened and the brackets 106 and 109 and the boom sections 107 and 108 suspended therefrom are swung to required angularly adjusted positions (Fig. 15) either in alignment with, or disposed angularly to, each other to provide lateral spacings between the spray nozzles 153 and 154 proportional to the row spacings of the crops to be sprayed.

If necessary the outer ends of the spray pipes 135 may be individually elevated or lowered by loosening the set screws 140 (Fig. 10) on the collars 139 and adjusting the collars and the hooks 138 mounted thereon outwardly or inwardly as required, normally to position the spray pipes 135 either horizontally, or at a desired angle of upward or downward tilt as desired. By means of this adjustment the spray pipes can be adjusted to a position parallel to the ground when the machine is operating on a side hill.

In their adjusted positions the boom sections tend to balance each other through the equalizing action of the flexible anchor 137 and the boom support cables 141 and 142, and to return to this balanced condition when displaced therefrom. This flexible mounting arrangement allows limited tilting or jarring of the mounting vehicle as it is driven along the rows of plants being sprayed without displacing the boom sections from their proper adjusted position.

The tension on the boom support cables, which is directed at an angle to the vertical, tends to draw the boom sections inwardly and to hold the arcuate edge portions of the plates 123 firmly against the followers 115 and 116. When either boom section is swung away from its suspended position beneath its pulley 122, it tends to return to such suspended position by gravity as illustrated diagrammatically in Figs. 12 and 13. As it approaches its lowermost, suspended position, the thrust on the boom section imposed by the tension on the boom support cable, forces the follower into the notch 131 in the plate 123, thereby anchoring the boom section in angularly adjusted position as determined by that of its suspension bracket 108 or 109.

With the boom sections properly adjusted for the spraying operation to be performed, and the tank 63 filled with a required quantity of spraying liquid, the pump 73 is operated from the engine by means of the pump drive belt 74. The valve 180 may be opened to permit the liquid to circulate from the tank 63, through the Venturi throat of the aspirating T-fitting 178 and the line 179 back into the tank. This circulation of liquid, either with or without entrained air bubbles drawn in from the spray nozzles through the hoses and three-way valve 182, agitates the spraying liquid in the tank and thereby tends to maintain in suspension any small solid particles of matter therein. The aspirating action of the fitting 178 reduces to below atmospheric the pressure in the line 181 to the intake opening of the three-way valve 182 and thence to the hoses and nozzles which may be in open communication therewith. This creates a suction effect on the nozzles and prevents dribbling of the spraying liquid therefrom between spraying operations.

The vehicle 21 is propelled and controlled in a usual manner for power propelled farm vehicles. At the beginning of a spraying operation the three-way valve 182 is adjusted to open the line 181 to one or the other or both of the hose lines 184 and 185 as desired. The machine is then driven along between the rows of crop plants to be treated and the valve 180 is closed to shut off the flow of liquid through the return line 179, and to force the liquid from the pump 73 through the line 181 and the selected hose or hoses 184 and 185 to the spray nozzles communicating therewith. In turning the machine around at the ends of the rows, the setting of the three-way valve need not be changed, but the valve 180 is opened to create suction on the nozzles being used as explained previously herein.

To reverse the mounted position of the spraying apparatus 20 from its forwardly mounted position shown in Figs. 1, 2 and 4 to its rearwardly mounted position shown in Fig. 5, the hoses 184 and 185 are disconnected from the three-way valve fitting 182, the pivot bolts 66 (Fig. 2) which secure the parallel links 75, 76 and 78, 79 to the forward shield member 65 are removed, and the cable 82 is disconnected from the coil suspension spring 83 and is withdrawn from the several pulleys over which it is run. The pivot bolt which supports the pulley 88 is then withdrawn and the pulley 88 and spring 83 are connected to the rear pulley support bracket 86 as shown in Fig. 5, and the parallel links are pivotally secured by the pivot bolts 66 to the seat slide rear support members 71.

The cable 82 is re-run from the winch 90 over an alternate series of pulleys, not shown, and over the pulley on the rear bracket 86. Thence the cable 82 is passed around the pulley 89 on the head frame 81, and its end again is secured to the coil suspension spring 83. The liquid supply hoses 184 and 185 are connected to their proper outlets of the three-way valve 182, whereupon the machine is again ready for use.

The rearwardly mounted position of the spraying apparatus as shown in Fig. 5, particularly in connection with the novel vehicle frame structure illustrated therewith, has some distinct advantages over other mountings on previous vehicle types. One such advantage lies in having the sprayed material distributed rearwardly of the operator and of the vehicle. This protects the operator and also avoids having droplets of liquid shaken off the plants by the passing of the vehicle. Even with the spraying nozzles located closely in rear of the vehicle, the sloping central frame structure allows a full vertical range of travel for the spray head. By having the spray boom sections mounted thus closely adjacent its rear end, the vehicle is very maneuverable, and therefore very little clearance is required at the ends of the rows of plants to allow the operator to make his turn and start down the next row.

For transporting the machine along a road or highway the steering wheel 32 may be turned to place the front wheels 24 and 25 in straight fore-and-aft position, and the steering mechanism locked in this position by means of the set screw 62 (Fig. 4). The rear end of the vehicle 21 may then be raised and the towing lug 61 secured to a cooperating hitch member, not shown, on a tractor or other towing vehicle, and the machine towed in this trailing position to a desired place of use.

The operation of the single hose arrangement shown in Figs. 6 and 7 will be obvious from an understanding of the foregoing description of the double hose arrangement. The principal difference between the single and double hose arrangements lies in the fact that with the double hose arrangement the operator, by means of the three-way valve 182, can control the liquid flow to the individual spray pipes from his seat on the vehicle, while with the single hose arrangement such selective adjustment must be made from the ground by means of the valves 200 and 201. With either hose arrangement he may use the valve 180 to control the flow of liquid to the nozzles by means of the aspirating system shown in Fig. 16.

While I have illustrated and described a preferred embodiment of the present invention, it will be understood however that various changes and modifications may be made in the details thereof without departing from the spirit and scope of the appended claims.

Having thus described the invention, what I claim as new and desire to protect by Letters Patent is as follows:

1. In a spraying apparatus adapted to be mounted on a supporting vehicle, a fixed support, a pair of spray boom sections adapted to be mounted for vertical swinging movement on the vehicle, a boom suspension element mounted above each boom section, a flexible anchor mounted between said suspension elements and secured to said support, and a pair of cable like support members having their inner ends attached to said flexible anchor and having the outer end of each attached to one of said boom sections, an intermediate portion of each cable like support member passing over one of said suspension elements normally to provide equalized balanced support for said boom sections on said vehicle.

2. In a spraying apparatus adapted to be mounted on a supporting vehicle, a fixed support, a pair of spray boom sections mounted for vertical swinging movement on said support, a boom suspension element mounted above each boom section, a flexible anchor mounted between said suspension elements and secured to said support, a pair of cables having their inner ends attached to said flexible anchor and having the outer end of each cable attached to one of said boom sections, an intermediate portion of each cable passing over one of said suspension elements normally to provide equalized balanced support for said boom sections on said vehicle, said flexible anchor comprising a pair of links one of which is attached to the inner end of each cable, said pair of links being secured together by another link common to both, and means flexibly connecting said other link to said support.

3. In a spraying mechanism, a spray boom suspension member mounted in angularly adjusted position on a supporting vehicle, means for angularly adjusting said member relative to the longitudinal vehicle axis, a spray boom section pivoted on said suspension member, and boom support means interconnecting said suspension member to said boom section to suspend the boom section from the suspension member at an angle normally corresponding to the angularly adjusted position of the suspension member.

4. In a spraying mechanism a head frame having a fixed pivot member thereon, a pair of spray boom suspension members pivoted on said pivot member, means for frictionally securing said suspension members in angularly adjusted position on said pivot member, a boom section pivotally mounted on each suspension member, and means suspending an outer portion of each boom section from the suspension member on which it is pivoted.

5. In a spraying mechanism a head frame, a first pivot thereon, a pair of spray boom support members mounted for angular adjustment on said first pivot, a pair of spray boom section pivots laterally offset on opposite sides of said first pivot, a pair of boom sections pivoted one on each of said latter pivots, each of said boom sections having an arcuate edge portion thereon, follower means mounted on said first pivot between the arcuate edge portions of said boom sections, and means suspending each of said boom sections from a suspension member, said last named means being disposed at an angle to the vertical to exert a gravitational thrust on the boom sections to urge said arcuate edge portions thereof inwardly into engagement with said follower.

6. In a spraying mechanism a head frame having a block portion, a pair of spray boom suspension members each having a yoke portion thereon mounted in endwise overlapping relation to receive said block portion therein, a single upright pivot bolt through said yoke portions and said block portion, means for clamping said yoke portions to said block portion frictionally to secure said suspension members in angularly adjusted position on said pivot bolt, a boom section pivotally mounted on each suspension member eccentrically to its axis of pivotal support on said bolt, and means suspending an outer portion of each boom section from the suspension member on which it is pivoted.

7. Plant spraying apparatus adapted to move along rows of crop plants, the rows being spaced apart on predetermined centers, said apparatus comprising a power propelled vehicle, a head frame adapted to be mounted for vertical adjustment on the vehicle, a spray boom suspension bracket mounted on said head frame for angular adjustment about an upright axis, a suspension element mounted on said bracket at a substantial distance radially from said upright axis, a boom support plate pivoted for relative sliding movement on said bracket radially between said upright axis and said boom suspension bracket, said boom support plate having a curved edge portion, a follower member mounted adjacent said curved edge portion and adapted to move relatively to said curved edge portion on a pivotal movement of said plate relatively to the boom suspension bracket, said plate having a positioning notch in the curved edge portion thereof adapted to receive said follower member in a predetermined angular position of said plate relatively to said follower member, a spray pipe mounted on said plate to extend radially outwardly therefrom, and means connecting said spray pipe to said suspension bracket, a flexible cable for suspending an outer portion of said spray pipe from said bracket, said cable being disposed at an angle to the vertical whereby the weight of the pipe on said connecting means will exert an endwise thrust tending to urge the notched, curved edge portion of the plate toward and against said follower member.

8. In a spraying apparatus, a pair of suspension members mounted for angular adjustment about a common pivot, means for securing the suspension members in angularly adjusted positions, a follower on said pivot, a boom section plate pivoted on each suspension member eccentrically of said common pivot, each of said plates having a curved edge portion, said curved edge portions being adapted to swing along said follower on pivotal movement of said plates relatively to their suspension members, a spray pipe pivotally connected to each plate and comprising a part of a boom section, and flexible means for suspending the spray pipe portions of each boom section from the suspension member of which its boom section is pivoted.

9. In a spraying apparatus, a pair of suspension members mounted for angular adjustment about a common pivot, means for securing the suspension members in angularly adjusted position, a follower member on said pivot, a pair of boom section plates pivoted respectively on said suspension members on opposite sides of said common pivot, said plates having limited slidable movement in a direction normal to their pivotal axes, each of said plates having a curved edge portion disposed in vertically offset relation and adapted to ride along said follower member as a result of pivotal movement of a said plate relative to its associated suspension member, each of said curved edge portions having a positioning notch therein for receiving opposite sides of said follower member, a spray pipe pivotally connected to each of said plates and comprising a part of a boom section pivotally connected to a said plate, and a flexible cable attached to each of said spray pipes for suspending the outer pipe portions of said boom sections from their associated suspension members, thereby cooperating with the weight of said spray pipes to urge the curved notched edge portions of said plates in opposite directions into engagement with said follower member.

10. Spraying apparatus comprising a supporting vehicle, a liquid supply tank mounted on said vehicle, a movable head frame mounted on said vehicle, means for vertically adjusting the position of said head frame on said vehicle, a pair of spray boom sections movably mounted on said head frame for pivotal adjustment about a common axis, flexible cable means respectively attached to the outer portions of said boom sections for suspending the boom sections from said head frame in predetermined angular relation to a horizontal plane and to the longitudinal axis of said vehicle, means for releasably retaining said boom sections in such angularly adjusted position, a plurality of spray nozzles symmetrically spaced along and throughout the combined lengths of said spray boom sections, pumping means for forcing liquid from said tank under pressure to said nozzles, and means on said spray boom sections for angularly and longitudinally adjusting the positions thereon of said flexible cable attaching means, release of said boom section retaining means permitting the angular suspended positions of said boom sections relative to the longitudinal axis of the vehicle to be varied at will to thereby proportionately change in effect the degree of spacing of said nozzles relative to said vehicle axis.

11. Spraying apparatus comprising a supporting vehicle, a liquid supply tank mounted on said vehicle, a head frame mounted on said vehicle, means for vertically adjusting the position of said head frame on said vehicle, a pair of boom sections having associated spray pipes mounted on said head frame for conjoint or independent pivotal adjustment about spaced axes, a fixed center nozzle on said head frame disposed in longitudinal alignment with and between said pivotal axes, flexible cable means for suspending said boom sections from said head frame in predetermined angular relation to a horizontal plane and to a longitudinal line through said center nozzle, means for releasably retaining said boom sections in such angularly adjusted position, a plurality of spray nozzles symmetrically spaced from said center nozzle and from each other throughout the combined lengths of said spray boom sections, and means for conveying liquid from said tank under pressure to said nozzles, release of said boom section retaining means permitting angular adjustment of the positions of said flexible cable suspending means to change the angular suspended positions of said boom sections about their said axes, and thereby proportionately vary the degree of effective lateral separation between the spray nozzles.

12. In an agricultural spraying apparatus a vehicle having a high arched frame at the forward end thereof, forward support wheels mounted on the legs of said arched frame, a relatively narrow rearwardly and downwardly sloping central frame connected at its higher forward end intermediately of said arched frame, a rear support wheel mounted on the lower terminal end of said downwardly and rearwardly sloping central frame, spaced pairs of parallel links pivotally mounted at their forward ends intermediately of the length of said sloping central frame and extending beyond the lower rear end thereof, a spray pipe head frame mounted on the free ends of said parallel links for vertical adjustment thereby, a winding drum rotatably mounted on said central frame, a flexible cable secured at one end to said drum and at its opposite end to a said vehicle frame, an intermediate portion of said cable slidably engaging said spray pipe head frame, whereby rotation of said drum in opposite directions respectively serves to elevate and lower said head frame, and spray boom means mounted on said spray head to extend laterally therefrom, said parallel links substantially corresponding to the slope of the central frame portion in a lowered position of the head frame.

13. In an agricultural spraying apparatus a vehicle having a high arched frame on the forward end thereof, support wheels mounted on the depending legs of said arched frame, a relatively narrow downwardly and rearwardly sloping central frame connected at its higher forward end intermediately of said arched frame, a rear support wheel mounted on the lower terminal end of said downwardly and rearwardly sloping central frame, spaced pairs of parallel links pivotally mounted at one end intermediately of said sloping central frame and extending rearwardly therefrom, a head frame mounted on the free ends of said parallel links, spray boom means mounted on said spray head to extend laterally therefrom, a pulley on said vehicle frame, a second pulley on said head frame, an elevating cable passing around said pulleys, means resiliently connecting one of said pulleys to its frame, and winch means on said vehicle for shortening and lengthening the distance between said pulleys resiliently to support the free ends of said links and said head frame in vertically adjusted position.

14. In an agricultural spraying apparatus a vehicle having a high arched frame on one end thereof, support wheels mounted on the legs of said arched frame, a narrow downwardly sloping central frame connected at its higher end to a mid-point of said arched frame, support wheels mounted on the lower end of said sloping central frame, spaced pairs of parallel links pivotally mounted at one end intermediately of said sloping central frame and extending beyond the lower end thereof, a spray head frame mounted on the free ends of said parallel links for vertical adjustment thereby, spray boom means mounted on said spray head frame to extend laterally therefrom, said pairs of parallel links substantially corresponding to the slope of said central frame in a lowered position of the spray head frame, and means for raising and lowering the free ends of said links to thereby adjust the spray boom means at desired vertically spaced elevations.

15. In a spraying apparatus adapted to be mounted on a vehicle, a pair of opposed and normally longitudinally aligned spray boom sections having spaced means for pivotally securing the same to the vehicle for conjoint and independent swinging movement in a horizontal plane relative to the longitudinal axis of the vehicle, a plurality of spray nozzles mounted in symmetrically spaced relation throughout the combined lengths of both boom sections, and common means for angularly effecting the adjustment of said boom sections in said horizontal plane relative to each other and to the longitudinal axis of the mounting vehicle, thereby proportionately varying the degree of separation of said nozzles from each other in a direction normal to said vehicle axis.

16. In a spraying mechanism a pair of laterally extending boom suspension members pivoted for angular adjustment about a common vertical axis, spray boom pipes individual to said boom suspension members mounted to normally extend in opposite lateral directions from said common vertical axis and to have substantially universal movement relative to their respective boom suspension members, and flexible means normally retaining said spray boom pipes in balanced vertically aligned relation relative to their respective boom suspension members and in substantially the same transverse plane beneath said suspension members while permitting of free substantially universal displacement of the pipes relative to their suspension members upon the striking of a fixed object by either of said spray boom pipes, thereby inducing the gravitational return of a displaced spray boom pipe to its normal balanced position subsequent to its clearing said fixed object.

JOSEPH B. KUCERA.

References Cited in the file of this patent

UNITED STATES PATENTS

| Number | Name | Date |
|---|---|---|
| 648,414 | Kenison | May 1, 1900 |
| 1,043,929 | Heard | Nov. 12, 1912 |
| 1,382,017 | Salandiner | June 21, 1921 |
| 1,583,619 | Splittstoser | May 4, 1926 |
| 1,634,701 | Williams | July 5, 1927 |
| 1,974,166 | Thompson et al. | Sept. 18, 1934 |
| 2,091,166 | Shiels | Aug. 24, 1937 |
| 2,221,433 | Pitner | Nov. 12, 1940 |
| 2,305,913 | Troyer | Dec. 22, 1942 |
| 2,438,534 | Bowers | Mar. 30, 1948 |
| 2,488,089 | Mayo | Nov. 15, 1949 |
| 2,491,283 | Schoenrock | Dec. 13, 1949 |
| 2,532,996 | Clark et al. | Dec. 5, 1950 |
| 2,539,288 | Van Horn | Jan. 23, 1951 |
| 2,548,209 | Foster | Apr. 10, 1951 |